United States Patent
De Rycke et al.

(10) Patent No.: US 12,410,655 B2
(45) Date of Patent: Sep. 9, 2025

(54) TRIPLE PANE VACUUM INSULATED GLASS UNIT

(71) Applicant: VKR HOLDING A/S, Hørsholm (DK)

(72) Inventors: Thibault De Rycke, Hørsholm (DK);
Simon Johnsen, Hørsholm (DK);
Søren Vejling Andersen, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 501 days.

(21) Appl. No.: 17/782,761

(22) PCT Filed: Dec. 9, 2020

(86) PCT No.: PCT/EP2020/085284
§ 371 (c)(1),
(2) Date: Jun. 6, 2022

(87) PCT Pub. No.: WO2021/116174
PCT Pub. Date: Jun. 17, 2021

(65) Prior Publication Data
US 2023/0015338 A1 Jan. 19, 2023

(30) Foreign Application Priority Data
Dec. 10, 2019 (DK) .............................. PA201970760

(51) Int. Cl.
*E06B 3/673* (2006.01)
*C03B 23/24* (2006.01)
(Continued)

(52) U.S. Cl.
CPC .......... *E06B 3/6736* (2013.01); *C03B 23/245* (2013.01); *C03C 8/24* (2013.01);
(Continued)

(58) Field of Classification Search
None
See application file for complete search history.

(56) References Cited

U.S. PATENT DOCUMENTS 8,221,857 B2 7/2012 Jaeger
2013/0292000 A1* 11/2013 Dennis .................. E06B 3/6612
141/7
(Continued)

FOREIGN PATENT DOCUMENTS

CN 2740605 Y 11/2005
EP 2966047 A1 1/2016
(Continued)

OTHER PUBLICATIONS

WO 2009003506 Machine Translation (Year: 2009).*
(Continued)

*Primary Examiner* — Barbara J Musser
(74) *Attorney, Agent, or Firm* — CANTOR COLBURN LLP

(57) ABSTRACT

Method for the production of a vacuum insulated glazing unit with more than two panes and a vacuum insulated glazing unit with more than two panes. In one example a triple pane vacuum insulated glazing assembly is fused and the cavity is backfilled during cooling whereby the centre pane temperature may be lowered. This has the advantage of keeping the stresses below the failure boundaries and enabling faster production.

21 Claims, 4 Drawing Sheets

(51) Int. Cl.
    *C03C 8/24*         (2006.01)
    *E06B 3/66*         (2006.01)
    *E06B 3/663*       (2006.01)
    *E06B 3/677*       (2006.01)

(52) U.S. Cl.
    CPC ........ *E06B 3/6612* (2013.01); *E06B 3/66304* (2013.01); *E06B 3/66342* (2013.01); *E06B 3/67326* (2013.01); *E06B 3/6775* (2013.01); *C03C 2207/00* (2013.01)

(56) References Cited

U.S. PATENT DOCUMENTS

2017/0203997 A1    7/2017   Miyake
2017/0313616 A1   11/2017   Tian

FOREIGN PATENT DOCUMENTS

| WO | WO-2009003506 A1 * | 1/2009 | ........... E06B 3/6612 |
|----|---|---|---|
| WO | 2009062557 A1 | 5/2009 | |
| WO | 2015058174 A1 | 4/2015 | |
| WO | WO-2018150016 A1 * | 8/2018 | ............. C03C 10/00 |
| WO | 2019208017 A1 | 10/2019 | |

OTHER PUBLICATIONS

International Search Report for corresponding application PCT/EP2020/085284 filed Dec. 9, 2020; Mail date Apr. 12, 2021.
Written Opinion for corresponding application PCT/EP2020/085284 filed Dec. 9, 2020; Mail date Apr. 12, 2021.

* cited by examiner

TRIPLE PANE VACUUM INSULATED GLASS UNIT

The invention relates to the production of a vacuum insulated glazing unit with more than two panes and a vacuum insulated glazing unit with more than two panes.

BACKGROUND

Vacuum insulated glass (VIG) units typically include two or more glass panes, spaced by an array of support structures e.g. spacers or pillars distributed between the glass panes. The glass panes are sealed with a side sealing at the periphery to provide an evacuated space (i.e., vacuum) located between the glass panes. The evacuated space is sealed at a reduced pressure such as 0.001 millibars or less in order to ensure an insulating effect of the VIG unit. The overall construction provides improved thermal and noise insulating properties compared to ordinary glass windows. The side sealing at the periphery of the glass sheets accordingly needs to be tight in order to provide that the desired internal pressure in the void can be maintained for several years. To prevent sagging and contact between adjacent glass panes, the support structures can serve as discrete spacers between adjacent glass panes.

When including three or more panes in the VIG unit as shown in US2017313616, U.S. Pat. No. 8,221,857 and EP2222609, the production of the VIG units need to take into account that the heat transfer from/to the outer panes and to/from the middle pane(s) in an evacuated space is limited. If the middle pane(s) is in contact with the side sealing, heat transfer may occur there through. However, the heat transfer is still limited by the small area of the middle glass pane(s) being in contact with the side sealing compared to the large surface area of the middle panes(s) not in contact with the side sealing. If the middle pane(s) is not in contact with the side sealing, the heat transfer need to occur through the spacers between the two outer panes and the middle pane(s). This process is very limited, as the spacers are very small compared to surfaces of the glass middle pane(s), which the spacers are in contact with. An exceeded temperature difference between the middle pane(s) and the outer panes may therefore result in fractures in the panes if the VIG unit is cooled at a fast rate under vacuum during the production process. Consequently, the production of VIG units comprising more than two panes are therefore slower and more expensive as compared to the production of VIG units comprising only two panes.

SUMMARY

Disclosed in a first aspect is a method for producing a vacuum insulated glazing unit. Disclosed in a second aspect is a method for reducing the occurrence of fractures in middle glass panes in a vacuum insulated glazing unit comprising one or more middle glass panes positioned inside a cavity in the vacuum insulated glazing unit.

The method of both the first and second aspects comprises providing a heated glass assembly at a first temperature, wherein the glass assembly comprises:
  a first glass pane and a second glass pane each comprising a first major surface, a second major surface, and a thickness defined by the distance between the first major surface, and the second major surface, wherein the second major surfaces, are inner surfaces opposing each other;
  a third glass pane with a first major surface, a second major surface, and a thickness defined by the distance between the first major surface and the second major surface, wherein the third glass pane is positioned between the opposing inner surfaces, of the first glass pane and the second glass pane;
  a side seal material forming a bond with at least the first glass pane and the second glass pane thereby enclosing a cavity formed between the first glass pane and the second glass pane;
  a number of spacers inside the cavity including a first set of spacers positioned between the first glass pane and the third glass pane and a second set of spacers positioned between the second glass pane and the third glass pane.

The third glass pane positioned between the opposing inner surfaces of the first glass pane and the second glass pane may also be referred to as a middle glass pane.

By major surfaces is meant the largest surface of the pane. The two major surfaces will oppose each other.

By glass assembly is meant the insulated glazing unit, which after the heating/cooling/evacuation/gas purging processes constitutes the VIG unit.

The method according to the first and second aspects further comprises:
  executing a first evacuation of the cavity;
  purging the evacuated cavity with a gas;
  reducing the temperature of the glass assembly to a second temperature while the gas is still present in the cavity;
  executing a second evacuation of the cavity to obtain a reduced pressure inside the cavity;
  sealing the cavity thereby obtaining the vacuum insulated glazing unit.

Disclosed in a third aspect is a method of providing a VIG unit, wherein the method comprises pumping in a gas prior into a cavity of a VIG assembly comprising two cavity parts separated by a glass pane subsequent to an evacuation step evacuating the cavity thereby providing a convection cooling inside the cavity of the VIG assembly during a further cooling, where after the cavity is evacuated and sealed.

By the methods of the first, second and third aspects are obtained an efficient production method, which allows for a fast cooling of the triple pane unit without introducing fractures in the middle third pane. During lowering of the assembly temperature under vacuum in the conventionally used production method, the middle pane is insulated by vacuum and remains hotter than the outer panes. This results in failures in the middle pane. In particular when a temperature difference between the hot central region of the middle pane in comparison to the cooler edge regions of the middle pane exceeds a specific value, failures will occur. A way to circumvent this problem, is to lower the temperature very slowly to avoid the large temperature difference between the central region and the edge regions of the middle pane. However, the gas purging or backfill of the cavity during cooling mitigates both problems and thereby reduces the cooling time at the same time as it eliminates the problems with fractures in the middle pane. Thus, the fast cooling in a gas atmosphere inside the VIG cavity provides an attractive alternative to the normally used method of cooling under reduced pressure, which introduces fractures in the glass pane due to the poor thermal transmittance between the panes under vacuum. The gas atmosphere may be oxygen enriched with ozone to provide additional surface cleaning during cooling.

As the triple-pane VIG unit is cooled while backfilling or purging the cavity between the outer panes with gas, conductive heat transfer to/from the third pane positioned as a middle pane is obtained. The gas thereby facilitates an efficient uniform cooling of the middle third pane reducing the temperature difference between the outer first/second panes and the middle third pane and to reduce the temperature difference between the edge of the middle third pane glass to the centre of the third glass pane in order to reduce thermal stress. The subsequent evacuating at lower temperature when the second temperature is reached will not result in a large enough temperature gradient to cause fractures.

Disclosed in a fourth aspect is a vacuum insulated glazing (VIG) unit comprising:
- a first glass pane and a second glass pane each comprising a first major surface, a second major surface, and a thickness defined by the distance between the first major surface, and the second major surface, wherein the second major surfaces, are inner major surfaces opposing each other;
- a third glass pane with, a first major surface, a second major surface, and a thickness defined by the distance between the first major surface and the second major surface, wherein the third glass pane also comprises:
  - a first set of parallel edge surfaces including a first edge surface and a second edge surface; and
  - a second set of parallel edge surfaces including a third edge surface and a fourth edge surface;
- wherein the third glass pane is positioned between the opposing inner surfaces, of the first glass pane and the second glass pane;
- a frame glass pane positioned between the first glass pane and the second glass pane, the frame glass pane comprising:
  - a first major surface extending in a same plane as the first major surface of the third glass pane;
  - a second major surface extending in a same plane as the second major surface of the third glass pane;
  - a thickness defined by the distance between the first major surface and the second major surface;
  - a first set of parallel inner edge surfaces including a first inner edge surface and a second inner edge surface;
  - a second set of parallel inner edge surfaces including a third inner edge surface and a fourth inner edge surface;
  - a first set of parallel outer edge surfaces including a first outer edge surface and a second outer edge surface;
  - a second set of parallel outer edge surfaces including a third outer edge surface and a fourth outer edge surface;
- a side seal material forming a bond with at least the first glass pane and the second glass pane thereby enclosing a cavity formed between the first glass pane and the second glass pane, wherein there is a gap between all of the edge surfaces and the side seal material;
- a number of spacers inside the cavity including a first set of spacers positioned between the first glass pane and the third glass pane and a second set of spacers positioned between the second glass pane and the third glass pane;
- one or more inserts positioned between at least one of the edge surfaces of the third glass pane and one of the inner edge surfaces of the frame glass pane opposing the edge surfaces of the third glass pane.

Disclosed in a fifth aspect is a vacuum insulated glazing (VIG) unit comprising:
- a first glass pane and a second glass pane each comprising a first major surface, a second major surface, and a thickness defined by the distance between the first major surface and the second major surface, wherein the second major surfaces are inner major surfaces opposing each other;
- a third glass pane with a first major surface, a second major surface and a thickness defined by the distance between the first major surface and the second major surface wherein the third glass pane also comprises:
  - a first set of parallel edge surfaces including a first edge surface and a second edge surface; and
  - a second set of parallel edge surfaces including a third edge surface and a fourth edge surface;
- wherein the third glass pane is positioned between the opposing inner surfaces of the first glass pane and the second glass pane;
- a side seal material forming a bond with at least the first glass pane and the second glass pane thereby enclosing a cavity formed between the first glass pane and the second glass pane, wherein there is a gap between all of the edge surfaces and the side seal material;
- a number of spacers inside the cavity including a first set of spacers positioned between the first glass pane and the third glass pane and a second set of spacers positioned between the second glass pane and the third glass pane;
- a frame glass pane positioned between the first glass pane and the second glass pane, the frame glass pane comprising:
  - a first major surface extending a same plane as the first major surface of the third glass pane;
  - a second major surface extending a same plane as the second major surface of the third glass pane;
  - a thickness defined by the distance between the first major surface and the second major surface;
  - a first set of parallel inner edge surfaces including a first inner edge surface and a second inner edge surface;
  - a second set of parallel inner edge surfaces including a third inner edge surface and a fourth inner edge surface;
  - a first set of parallel outer edge surfaces including a first outer edge surface and a second outer edge surface;
  - a second set of parallel outer edge surfaces including a third outer edge surface and a fourth outer edge surface;
- wherein the third glass pane and the frame glass pane are an integral glass pane with one or more of the edge surfaces of the third glass pane connected to one or more of the inner edge surfaces of the frame glass pane by glass pane bridges.

Disclosed in a sixth aspect is a vacuum insulated glazing (VIG) unit comprising:
- a first glass pane and a second glass pane each comprising a first major surface, a second major surface, and a thickness defined by the distance between the first major surface and the second major surface, wherein the second major surfaces are inner major surfaces opposing each other;
- a third glass pane with, a first major surface, a second major surface and a thickness defined by the distance between the first major surface and the second major surface wherein the third glass pane also comprises:
  - a first set of parallel edge surfaces including a first edge surface and a second edge surface; and
  - a second set of parallel edge surfaces including a third edge surface and a fourth edge surface;

wherein the third glass pane is positioned between the opposing inner surfaces of the first glass pane and the second glass pane;

a side seal material forming a bond with at least the first glass pane and the second glass pane thereby enclosing a cavity formed between the first glass pane and the second glass pane, wherein there is a gap between all of the edge surfaces and the side seal material;

a number of spacers inside the cavity including a first set of spacers positioned between the first glass pane and the third glass pane and a second set of spacers positioned between the second glass pane and the third glass pane;

one or more inserts positioned between at least one of the edge surfaces of the third glass pane and the side seal material.

By the VIG unit according to the fourth, fifth, and sixth aspects are obtained a triple pane VIG unit, where the third pane in the middle is held in position efficiently during the production of the unit and after end production. The inserts or the glass bridges can hold the middle pane without further need to glue-like substances. This makes the production method very efficient. The may also be interconnect by bridges extending over the gap. The combined glass pane constituting the third glass pane and the frame glass pane may correspond to the previously described third glass pane with one or more openings. The openings may be seen as elongated square openings, often much larger than a discrete small round opening. Alternatively, a plurality of round openings may separate the middle glass pane into a third glass pane and a frame glass pane part.

Disclosed in a seventh aspect is a window comprising a vacuum insulated glazing unit produced by the method according to the first or second aspect.

Disclosed in an eighth aspect is a window comprising a vacuum insulated glazing unit according to the fourth, fifth, or sixth aspect.

Description of the Aspects

In the following, the different aspects will be described in further details.

Disclosed in a first aspect is a method for producing a vacuum insulated glazing unit, wherein the method according comprises:

providing a heated glass assembly at a first temperature;
executing a first evacuation of the cavity;
purging the evacuated cavity with a gas;
reducing the temperature of the glass assembly to a second temperature while the gas is still present in the cavity;
executing a second evacuation of the cavity to obtain a reduced pressure inside the cavity;
sealing the cavity thereby obtaining the vacuum insulated glazing unit.

Disclosed in a second aspect is a method for reducing the occurrence of fractures in middle glass panes in a vacuum insulated glazing unit comprising one or more middle glass panes positioned inside a cavity in the vacuum insulated glazing unit, wherein the method according comprises:

providing a heated glass assembly at a first temperature;
executing a first evacuation of the cavity;
purging the evacuated cavity with a gas;
reducing the temperature of the glass assembly to a second temperature while the gas is still present in the cavity;
executing a second evacuation of the cavity to obtain a reduced pressure inside the cavity;
sealing the cavity thereby obtaining the vacuum insulated glazing unit.

The heated glass assembly according to the first and second aspects transfers into a vacuum insulated glazing (VIG) unit after finalizing the method according to the first and second aspects, and comprises:

a first glass pane and a second glass pane each comprising a first major surface, a second major surface, and a thickness defined by the distance between the first major surface, and the second major surface, wherein the second major surfaces, are inner surfaces opposing each other;

a third glass pane with a first major surface, a second major surface, and a thickness defined by the distance between the first major surface and the second major surface, wherein the third glass pane is positioned between the opposing inner surfaces, of the first glass pane and the second glass pane;

a side seal material forming a bond with at least the first glass pane and the second glass pane thereby enclosing a cavity formed between the first glass pane and the second glass pane;

a number of spacers inside the cavity including a first set of spacers positioned between the first glass pane and the third glass pane and a second set of spacers positioned between the second glass pane and the third glass pane.

The third glass pane positioned between the opposing inner surfaces of the first glass pane and the second glass pane may also be referred to as a middle glass pane.

Obtaining the heated glass assembly at the first temperature may be a result of a heating during production of the VIG unit to integrate/soften the side seal material or a thermal cleaning of the VIG unit after the side seal material has integrated with the outer first and second panes. Other pre-heating steps may also be envisioned.

By a first evacuation is normally meant an evacuation to obtain a reduced pressure such as 0.001 millibars or less. In some instances, it may be necessary to reduce the pressure to only 0.001 bar. The purpose of the first evacuation is normally to remove gas impurities from inside the cavity.

By purging the evacuated cavity with a gas is meant that the gas is purged through the cavity. The gas may be continuously purged through the cavity while reducing the temperature to the second temperature. Alternatively, an amount of gas may be purged into the cavity and maintained there during the lowing of the temperature to the second temperature.

By a second evacuation is meant an evacuation to obtain a reduced pressure, such as a vacuum.

In one or more examples, the first temperature is a solidification temperature at which the side seal material solidifies. By solidification temperature is meant the temperature at which the side seal material solidifies after being heated to a temperature where it is softened allowing it to integrated with the first and the second panes.

The first temperature may be between 275 and 450 degrees Celsius, such as between 290 and 360 degrees Celsius, such as between 300 and 350 degrees Celsius. As the temperature at which a material softens, melts, solidifies etc. depends on the contents of which the material is comprised, the first temperature depend on the side seal material chosen.

The temperature of the heated glass assembly may be maintained at the first temperature while executing the first evacuation of the cavity. During the first evacuation, the glass panes may be thermally cleaned. The fractures observed in the panes, often in the third pane, when reducing the temperature while evacuating the cavity is avoided by maintaining the temperature at the first temperature as the thermal transmittance is not negatively affected when maintaining the temperature.

In one or more examples, the method further comprises maintaining the temperature at the first temperature for a period of time between 10 and 60 minutes, such as between 20 and 50 minutes, such as between 25 and 45 minutes, such as between 25 and 30 minutes prior to lowering the temperature to the second temperature. Likewise, the first evacuation of the cavity may proceed for a period of time between 10 and 60 minutes, such as between 20 and 50 minutes, such as between 25 and 45 minutes, such as between 25 and 30.

The second temperature is lower than the first temperature. In one or more examples, the second temperature is at least 10%, such as at least 20%, such as at least 30%, such as at least 40%, such as at least 50%, such as at least 60% lower than the first temperature. The larger the temperature difference is between the first and second temperature, the smaller the difference is between the second temperature and room temperature, the latter being the temperature at which the VIG unit is normally handled when the production of the VIG unit is finalized.

In one or more examples, the second temperature is between 20 and 300 degrees Celsius, such as between 50 and 290 degrees Celsius, such as between 80 and 270 degrees Celsius, such as between 110 and 250 degrees Celsius, such as between 120 and 230 degrees Celsius, such as between 130 and 200 degrees Celsius, such as between 140 and 160 degrees Celsius, or approximately 150 degrees Celsius. The second temperature may be as low as room temperature. The second temperature will, as the first temperature did, be depending on the contents of which the side seal material is comprised.

The cooling of the glass assembly from the first temperature to the second temperature may occur at a continuous a cooling rate. In one or more examples, cooling of the glass assembly from the first temperature to the second temperature proceeds at a cooling rate of at least 1 degrees Celsius per minute, such as at least 2 degrees Celsius per minute, such as at least 5 degrees Celsius per minute, such as at least 10 degrees Celsius per minute. The cooling rate may also refer to an average cooling rate if the cooling does not occur continuously. Thus, the cooling can occur at a continuous rate or at varying rates.

In one or more examples, the method further comprises reducing the temperature of the glass assembly from the second temperature to a third temperature while executing the second evacuation of the cavity and prior to sealing the cavity. The sealing of the cavity may be performed at the third temperature.

In one or more examples, the third temperature is between 10 and 200 degrees Celsius, such as between 10 and 175 degrees Celsius, such as between 10 and 140 degrees Celsius, such as between 10 and 100 degrees Celsius, such as between 20 and 90 degrees Celsius, such as between 40 and 80 degrees Celsius, such as between 50 and 70 degrees Celsius. The third temperature may be around room temperature. The cooling of the glass assembly from the second temperature to the third temperature may proceed at a second cooling rate of at least 1 degrees Celsius per minute, such as at least 2 degrees Celsius per minute, such as at least 5 degrees Celsius per minute, such as at least 10 degrees Celsius per minute. The difference between the second temperature and the third temperature in combination with the second cooling rate needs to be at a level, which ensures that fracture due to poor thermal transmittance between the panes at reduced pressure is avoided. The difference between the second temperature and the third temperature may be 0 degrees or close to 0 degrees.

The cooling rate for cooling of the glass assembly from the first temperature to the second temperature may be the same as the second cooling rate cooling of the glass assembly from the second temperature to the third temperature. The second cooling rate may refer to an average cooling rate if the cooling does not occur continuously, or to a continuous cooling.

The heated glass assembly may be obtained in a number of different manners serving different purposes. In one or more examples, prior to providing the heated glass assembly having the first temperature, the method further comprises:
  proving the glass assembly at a fourth temperature; and
  reducing the temperature of the glass assembly from the fourth temperature to the first temperature.

The fourth temperature may be a softening temperature at which the side seal material is softened allowing it to bond with at least the first glass pane and the second glass pane when lowering the temperature to the first temperature. The softening temperature will depend on the material properties of the side seal material. In one or more examples, the fourth temperature is between 350 and 450 degrees Celsius, such as between 370 and 425 degrees Celsius, or such as between 380 and 410 degrees Celsius.

The method may further comprise maintaining the temperature at the fourth temperature for a period of time between 10 and 60 minutes, such as between 20 and 50 minutes, such as between 25 and 45 minutes, such as between 25 and 30 minutes prior to lowering the temperature to the first temperature. The time period at the fourth temperature needed in order to ensure that the side seal material is sufficiently soft for it to bond with the glass panes depends on the material properties of the side seal material, the thickness of the side seal material layer, the temperature to which the side seal material is heated, etc.

Prior to softening of the side seal material, the side seal material may need to be heated to an intermediate temperature. In one or more examples, prior to providing the heated glass assembly having the fourth temperature, the method further comprises:
  proving the glass assembly at a fifth temperature; and
  increasing the temperature of the glass assembly from the fifth temperature to the fourth temperature.

The fifth temperature may be a burn off temperature at which impurities in the side seal material is burned off. Such impurities may include binder and/or solvents. Also, a general outgassing of the side seal material prior to the procedure of bonding the side seal material to the glass panes may also be performed at the fifth temperature. As was the case for the softening and solidification temperature, the fifth temperature will also depend on the material properties of the side seal material possibly including additional contents such as binder and solvent. In one or more examples, the fifth temperature is between 270 and 360 degrees Celsius, such as between 280 and 340 degrees Celsius, or such as between 300 and 330 degrees Celsius.

Depending on the material properties of the side seal material and potential additional contents such as binder and solvent, the fifth temperature may be maintained for a period of time. In one or more examples, the method further comprises maintaining the temperature at the fifth temperature for a period of time between 10 and 60 minutes, such as between 20 and 50 minutes, such as between 25 and 45 minutes, such as between 25 and 30 minutes prior to increasing the temperature to the fourth temperature.

In one or more examples, the firth temperature is higher than the first temperature.

Normally, the glass assemble will be initially provided at a lower temperature. In one or more examples, prior to providing the heated glass assembly having the fifth temperature, the method further comprises:

proving the glass assembly at room temperature; and
increasing the temperature of the glass assembly from room temperature to the fifth temperature.

Alternatively, the glass assembly may be assembled at a higher temperature. The heating step of heating to the fifth temperature and maintaining the temperature at this level for a period of time, may be therefore be omitted if the side seal material is supplied e.g. in a softened form not comprising solvent or binder.

Different types of gasses may be used for the purging of the cavity. In one or more examples, the cooling gas is selected from the group of; dry air, an inert gas, carbon dioxide $CO_2$, nitrogen $N_2$, and ozone $O_3$, or a mixture thereof. Most often used gasses are gasses, which can be absorbed by a getter after sealing of the cavity. Dry gases are often used, since water is strongly bound to the glass surface, which will make evacuation at the end more challenging. By using a dry gas, a getter positioned inside the cavity can thereby capture any residual gas left in the cavity after sealing the cavity. Thus, getterable gases are often used so that any residual gas pressure after final evacuation can be gettered. One exception where a non-getterable gas (e.g. Argon) should be used is when the getter is activated by the production process and hence active during the purging of the gas. Using a getterable gas in this situation will saturate the getter.

In one or more examples, the getter is activated after sealing the cavity. In one or more alternative examples, the getter is activated before sealing the cavity.

The lighter the gas used for purging the cavity is, the higher the thermal conductivity is. Hence, in general faster cooling can be expected for lower molecular weight gasses.

In one or more examples, the gas is purged into the evacuated cavity at a pressure of 0.01-0.50 atmosphere, such as 0.03-0.40 atmosphere, such as 0.04-0.20 atmosphere, such as 0.05-0.10 atmosphere. This pressure is lower than the atmospheric pressure, but is normally high enough to increase the thermal transmittance (the U value) to a level allowing for efficient cooling of the middle third pane.

Control of the gas pressure inside the cavity will provide the producer control of the cavity atmosphere thermal conductivity. The operator may thereby control cooling rates of the third glass pane and/or control the temperature difference between the outer first and second panes and the inner third pane. By having a slightly higher temperature of the middle third pane, water contamination of the middle third pane may be avoided.

In one or more examples, the first glass pane comprises an evacuation opening. The method may therefore further comprise placing an evacuation cup over the evacuation opening proving access to the cavity prior to initiating any temperature increasing/decreasing steps or at any point before evacuation. In one or more examples, reducing the pressure inside the sealed cavity during the first evacuation and the second evacuation is obtained by means of the evacuation cup. The evacuation cup may further used for supplying the gas to the cavity.

In one or more examples, an evacuation member is comprised in the evacuation opening. The evacuation member may be a hollow tube, such as a hollow glass tube. Using a hollow tube provides an easy way of obtaining contact to the cavity from outside the VIG unit. The hollow tube may be sealed to the first glass pane by a sealing material, such as a frit material, possibly forming integral bonds with the first pane in a manner similar to that of the side seal material.

Closing a hollow tube can be obtained in different manners. In one or more examples, the method further comprises closing the hollow tube by means of a second heating source when the glass assembly is at the third temperature thereby sealing the cavity. The second heating source may be a providing a local heating of primarily/only the hollow glass tube. A few seconds heating of the hollow tube at high temperatures are normally sufficient to melt the hollow tube thereby forming an efficient sealing of the cavity.

Alternatively, in one or more examples, reducing pressure inside the sealed cavity to the first pressure and the second pressure is obtained through openings between the side seal material and the glass panes, prior to finalizing the sealing of the cavity. Such opening are normally very small, but may be sufficient for reducing the cavity. In particular if the glass assembly is positioned in a vacuum chamber. Thus, in one or more examples, the method further comprises placing the glass assembly inside a vacuum chamber prior to reducing pressure inside the sealed cavity.

Any suitable side seal material known in the industry may be used in the methods for production of the VIG unit according to the above aspects. The side seal material may be a soldering material, for example a glass solder frit material. The glass solder frit material may have a low melting temperature, wherein thermal treatment may be used to hermetically seal the periphery of the VIG unit.

In an example, the glass solder frit material includes vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or a combination thereof. The soldering material may be provided as a combination of two different materials comprising glass solder frit with different thermal expansion coefficients that are adjusted to correspond to the thermal expansion coefficients of the bonded parts. Also, several solder materials may allow pre-sintering of a first solder to the glass surface and subsequently use of a second solder to join to the first solder.

In one or more examples, the side seal material may be a lead free solder glass material. In one or more examples, the side seal material comprises less than 0.1% lead. For example, side seal material may be a vanadium-tellurium oxide solder glass material.

In one or more examples, a low melting point solder glass material comprising the following ingredients: tellurium dioxide, divanadium pentaoxide, aluminium oxide in glasses/pigments and manganese dioxide. The concentrations of the ingredient may be 30-50% tellurium dioxide, 20-30% divanadium pentaoxide, 5-10% aluminium oxide in glasses/pigments and 1-5% manganese dioxide.

In one or more examples, the glass material in the side seal material may be a glass powder material, such as an amorphous glass powder material, that is heated and melted by means of a heating arrangement before it is applied. Thus, the side seal material may be an amorphous glass solder material.

In one or more examples, the side seal material comprises a binder component. The binder may be any suitable material, including but not limited to nitrocellulose, methylcellulose, hydroxypropyl methylcellulose, hydroxypropyl cellulose, bentonite H, laponite XL2, laponite RD, poly (alkylene carbonate)s such as poly(ethylene carbonate), poly (propylene carbonate) poly(propylene-cyclohexene carbonate), poly(cyclohexene carbonate), poly(butylene carbonate), or the like, or combinations thereof.

The side seal material may comprise from 80 to 99 wt % of the glass frit powder and from 0.001 to 20 wt % of the binder, more preferably from 80 to 95 wt % of the glass frit powder and from 0.25 to 5 wt % of the binder, even more preferably from 90 to 98 wt % of the glass frit powder and from 0.5 to 1.5 wt % of the binder, wherein the amounts are based on the total weight of the side seal material.

The side seal material may further include wetting agents in an amount of up to 5 wt % to improve the wetting of the glass frit powder after mixing. Suitable wetting agents include poly(ethylene glycol) alkyl ethers and silicone additives.

Dispersants may be added to the side seal material. One type of dispersant is a surfactant, such as a polyphosphate, phosphate ester, metal silicate, or metal carbonate which may be included in an amount of up to 2 wt %. Another class of dispersant is a water soluble polymeric dispersant such as polyoxyethylene, poly(vinyl alcohol), poly(acrylic acid), or poly(vinylpyrrolidone) which may be included in an amount of up to 5 wt %.

The side seal material may further include antifoam agents in an amount of up to 1 wt % to minimize foaming during mixing and/or dispensing, which could potentially lead to bubble formation. Defoamers based on polyoxyethylene or silicones may be used.

The side seal material may also include fillers to adjust the CTE and/or viscosity of the composition. Suitable fillers include, but are not limited to, $Li_2O \cdot Al_2O_3 \cdot 2SiO_2$, ZnAs glass-ceramic, LiZnMgAs, $Zr_4(WO_4)(PO_4)_2$, $K_2O \cdot Al_2O_3 \cdot 2SiO_2$, $ZrO_2$, $(Co,Mg)_2 \cdot P_2O_7$, or the like, or combinations thereof.

In order to obtain a connection between the cavities in the VIG unit separate by the third pane, different means may be used. In one or more examples, the third glass pane comprises one or more openings connecting a first part of the cavity defined by the first glass pane and the third glass pane with a second part of the cavity defined by the second glass pane and the third glass pane. One opening may be sufficient for obtaining a connection between the two cavity parts, e.g. for ensuring that the two cavity parts have the same pressure and/or concentration of gas, the latter being during the purging step.

The third glass pane will normally comprise:
a first set of parallel edge surfaces including a first edge surface and a second edge surface;
a second set of parallel edge surfaces including a third edge surface and a fourth edge surface.

The connection between the two cavity parts may be obtained by having a gap between the third glass pane and the side seal material. Thus, in one or more examples, there is a gap between all of the edge surfaces and the side seal material. Alternatively, the gap may only be present between one, two, or three of the edge surfaces and the side seal material. The gap may be an alternative to the one or more openings in the third glass pane. The combination of a gap and one or more openings may also be envisioned.

In one or more examples, the glass assembly further comprises a frame glass pane positioned between the first glass pane and the second glass pane. The frame glass pane comprises:
a first major surface extending in a same plane as the first major surface of the third glass pane;
a second major surface extending in a same plane as the second major surface of the third glass pane;
a thickness defined by the distance between the first major surface and the second major surface;
a first set of parallel inner edge surfaces including a first inner edge surface and a second inner edge surface;
a second set of parallel inner edge surfaces including a third inner edge surface and a fourth inner edge surface;
a first set of parallel outer edge surfaces including a first outer edge surface and a second outer edge surface;
a second set of parallel outer edge surfaces including a third outer edge surface and a fourth outer edge surface;
wherein the inner edge surfaces are extending into the cavity,
wherein the outer edge surfaces are extending into the side seal material.

In this configuration, the third glass pane is not at such in contact with the side seal material, but is instead floating in the middle of the cavity or is held by one or more insets.

In one or more examples, there is a gap between the edge surfaces of the third glass pane and the inner edge surfaces of the frame glass pane.

In one or more examples, the thickness of the third glass pane and the thickness of the frame glass pane is the same. The two panes may also be aligned in the same horizontal plane. In this configuration, the combination of the third glass pane and the frame glass pane may also be seen as forming one glass pane with a through-going channel extending along all the sides of the glass pane. The third glass pane and the frame glass pane may also be interconnect by bridges extending over the gap. In such configuration, the combined glass pane may correspond to the previously described third glass pane with one or more openings, where the openings are seen as elongated square openings, often much larger than a discrete small round opening. Alternatively, a plurality of round openings may separate the middle glass pane into a third glass pane and a frame glass pane part.

In one or more examples, the third glass pane is held between the first glass pane and the second glass pane by one or more inserts positioned between at least one of the edge surfaces of the third glass pane and one of the inner edge surfaces of the frame glass pane opposing the edge surfaces of the third glass pane. The one or more inserts may be resilient inserts, such as resilient springs, e.g. metal springs. The resilience will allow for the third pane to expand/retract during the production process without the third pane breaking or changing its position.

The or more inserts may also serve as getters. The one or more inserts may also have a low thermal conductance. If the inserts are made of metal, they may be thin and long, e.g. having a V-shape, so they do not serve as thermal shunts between glass frame pane and the third glass pane. Insert material may be chosen so it does not lose its mechanical properties after being heated to the highest temperature in the process. Alternatively, the inserts may loss their mechanical properties in part, and therefore only hold the third glass pane in place during production until the viscosity of the side seal material is lowered during cooling. The latter is normally below 400 degrees Celsius.

The gap between the frame glass pane and the third pane may be positioned close to the side seal material and the periphery of the first and second glass panes such that the inserts are hidden by a sash when the VIG unit is included in a window frame, such as a roof top window frame.

In one or more examples, prior to heating the glass assembly, the third glass pane is held between the first glass pane and the second glass pane by a binder on the one or more of the spacers, wherein the binder burns off when increasing the temperature to the fifth temperature, and wherein after the binder has burned off, the evacuation of the cavity holds the third glass pane in place. In this manner, the third pane is allowed to float freely at its perimeters.

In one or more examples, the side seal material is positioned on the second major surfaces, of the first and second glass panes and on the major surfaces of the frame glass pane. If a frame glass pane is not included in the VIG unit, the edge surfaces of the third pane may extend into the side seal material. Thus, in one or more examples, the side seal material is positioned on the second major surfaces of the first and second glass panes and on the major surfaces of the third glass pane.

Any suitable glass from which glass panes can be obtained may be used for the glass panes. Examples include a soda lime silica glass and an alkali aluminosilicate glass.

In one or more examples, the glass panes are annealed glass panes or tempered glass panes. Thus, at least one of the glass panes may be a tempered glass panes. The term "tempered glass pane" as used herein is understood to mean glass panes in which compressive stresses have been introduced in the surface(s) of the glass pane. For glass to be considered strengthened this compressive stress on the surface(s) of the glass can be a minimum of 69 MPa (10,000 psi) and may be higher than 100 MPa. The VIG is heated during production in order to form the periphery seal etc. and some glass strength may be annealed or lost during manufacture.

In one or more examples, the tempered glass panes have been tempered by thermal tempering, chemical tempering, plasma tempering, or a combination comprising at least one of the foregoing.

Tempered glass, also known as toughened glass, may be produced from annealed glass by means of a strengthening procedure, which e.g. may be thermal tempering, chemical tempering, or plasma tempering with the purpose of introducing the compressive stresses into the surface(s) of the glass pane. After tempering, the stress developed by the glass can be high, and the mechanical strength of tempered glass can be four to five times greater than that of annealed glass.

The tempered glass panes may have been tempered by thermal tempering. Thermally tempered glass may be produced by means of a furnace in which an annealed glass pane is heated to a temperature of approximately 600-700° C., after which the glass pane is rapidly cooled. The cooling introduces the compressive stresses into the glass pane surface(s).

In one or more examples, the glass panes are chemically tempered glass panes. A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions, which causes the material at the glass pane surfaces to be in a compressed state. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours. The incorporation of the larger ions into the glass strengthens the sheet by creating a compressive stress in a near surface region. A corresponding tensile stress is induced within a central region of the glass to balance the compressive stress.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium, or magnesium ions, whereby the replacement ions are driven into the opposing surfaces of the glass pane so as to increase the strength of the pane.

The glass panes each has a thickness defined by the distance between the first major surface and the second major surface of the glass panes. The thickness of the glass panes may be the same, which allows for usage of the same production lines for producing the glass panes.

The thickness of the glass pane may be different if e.g. a coating layer or similar is applied on one of the panes. A thinner glass pane may also be used for one of the glass panes possibly reducing production costs. In one or more examples, the thickness of the third glass pane is smaller than the thickness of the first glass pane and/or the thickness of the second glass pane. By using a thin glass pane as the third glass pane positioned inside the cavity, a smaller amount of side seal material is needed—in particular if the third glass pane in floating in the middle of the cavity not touching the side seal material.

In one or more examples, the thickness of the first glass pane is between 1-8 mm, or between 1.5-6 mm, or between 2-5 mm, or between 2.5-4.5 mm.

In one or more examples, the thickness of the second glass pane is between 1-8 mm, or between 1.5-6 mm, or between 2-5 mm, or between 2.5-4.5 mm.

In one or more examples, the thickness of the third glass pane is between 0.2-2.0 mm, or between 0.4-1.5 mm, or between 0.7-1.2 mm, or between 0.8-1.0 mm. Normally, one aims to find the balance between having a thin glass pane which is not too thin for it to become fragile and thereby perhaps more expensive due to the glass material needed to prevent breaking of it, but still thin enough to offer a thin VIG unit.

The major surfaces of the glass panes may further be laminated with a lamination material. In one or more examples, one or more of the major surfaces inside the cavity comprises a lamination material layer having a thickness of between 0.5-3 mm, or between 1-3 mm, or between 1-2.5 mm.

The glass panes are normally substantially transparent to visible light although they may be tinted in some examples. Normally, the glass panes will be at least about 50% transparent, such as at least about 70% transparent, such as at least about 80% transparent, or such as at least about 90% transparent.

In one or more examples, one or more of the major surfaces, inside the cavity comprises a low emittance coating layer. By low emittance (low-E) coating layer is included a low emittance or low emissivity low-E surface coating. Any suitable low-E coating may be used. Low-E coating may comprise several layers, including silver layers. Low-E coatings may include a layer of an infrared-reflecting film and one or more optional layers of a transparent dielectric film. The infrared-reflecting film, which may include a conductive metal such as silver, gold, or copper, reduces the transmission of heat through the coated pane. A dielectric film may be used to anti-reflect the infrared-reflecting film and to control other properties and characteristics of the coating, such as color and durability. Commonly used dielectric materials include oxides of zinc, tin, indium, bismuth, and titanium, among others.

Example low-E coatings include one or two silver layers each sandwiched between two layers of a transparent dielectric film. Increasing the number of silver layers may increase the total infrared reflection, although additional silver layers may also reduce the visible transmission through the window and/or negatively impact the coating's color or durability.

In one or more examples, between two and four of the major surfaces inside the cavity comprises the low emittance coating layer. In one or more examples, the major surfaces of the third glass pane is absent of a low emittance coating layer.

Conductive heat transfer is particularly important, when radiative heat transfer is low. If a low emittance coating layer is used on one or both of the major surfaces of the third pane as the middle pane, radiative heat loss for this pane is minimized. This keeps the middle third pane at even higher temperatures compared to the outer first and second panes and the rest of the VIG unit. Adding a conductive heat transfer channel in the form of the purging of the gas during the production counteracts this problem.

The spacers inside the cavity can be arranged in different manners both within the first set of spacers between the third glass pane and the first glass and the second set of spacers between the second glass pane and the third glass pane. In one or more examples, the spacers in the first set of spacers is positioned opposite a spacer in the second set of spacers. By positioning the spacers opposite each other, a spacer on each side of the third glass pane, exerts an approximately even force onto the third glass pane from opposite directions. This ensures that the third pane does not twist. Visually it may appear that there is through-going spacer extending through the third pane instead of two spacers on opposite sides of the panes.

Alternatively, in one or more examples, the spacers in the first set of spacers is positioned between spacers in the second set of spacers. By between is meant that the spacers in the two sets are not opposite each other in a spacer through-going manner. The configuration may be symmetrical in that the spacers on one side of the third pane may be positioned with the same distance to four spacers on the opposite side of the third pane. Using a different spacer position in the first set of spacers as compared to the second set of spacers may create a VIG unit where the user less easily notices the spacers when looking out the window into which the VIG unit has been inserted as the eye often pays less attention to an uneven and random positioning of spacers compared to an even-structured positioning. Further, thermal conductance directly through the third pane from spacers on opposite sides of the pane is avoided by not positioning the spacers directly on opposite sides of each other.

The set of spacers inside each of the cavities may be arranged in arrays separated by a distance $d_{spacer}$ between adjacent spacers. The distance between spacers, or the spacer-to-spacer distance between each adjacent spacer, may be between 20 to 120 mm, such as e.g. 25 to 80 mm, or 30 to 60 mm. The distance between spacers may be measured from an outer edges of adjacent spacers. Alternatively, the distance between spacers may be measured from the centres of adjacent spacers. The spacer-to-spacer distance may be the same or different between each adjacent spacer. Using the same spacer-to-spacer distance may simplify the process of positioning the spacers on one of the glass panes as the same settings may be used in the tool, which places the spacers. Using a different spacer-to-spacer distance may create a VIG unit where the user less easily notices the spacers when looking out the window into which the VIG unit has been inserted as the eye often pays less attention to an uneven and random positioning of spacers compared to an even-structured positioning.

It is understood that the spacers may generally be arranged in a repeated pattern such as a grid with parallel rows and columns having substantially the same distance between neighbouring support structures. Alternatively, the spacers may be arranged in a pattern that has been determined/adapted based on a predetermined stress profile. This stress profile may e.g. be established by means of tests and/or computer simulations of a VIG unit. In this case, the distance between neighbouring spacers may across the VIG unit be different at certain areas of the VIG unit. For example so that there is a larger distance between some neighbouring spacers where the stress conditions are lower, and possibly a higher number of spacers where the stress conditions may be, or potentially become, higher.

Greater distances between spacers may increase the compressive load on each spacer and may introduce stress patterns and cracks in the panes in the VIG unit. Normally, it will however also reduce the thermal transmittance. A denser positioning of the spacers may therefore be used in specific region to increase the robustness of the VIG unit.

The spacers may have a height of 0.05 to 0.7 mm, such as between 0.1 to 0.4 mm, or between 0.15 to 0.3 mm. In one or more examples, the spacers have the same height. This keeps the production cost low as only one type of spacer is needed.

The tool used for positioning the spacers on the glass panes will further not need to have individual settings for placing spacers with a difference in height.

The spacers may alternatively have the different heights, including at least two different heights. As the distance between the first and third glass pane and the third and second glass pane may vary from region to region in VIG unit, a difference in height of the spacers will allow for compensation of these distance variations. In one or more examples, each spacer independently has a height of 0.05 to 0.7 mm, preferably 0.1 to 0.4 mm, more preferably 0.15 to 0.3 mm.

The spacers may have a diameter of between 0.1 to 1 mm, or between 0.2 to 0.8 mm, such as between 0.3 to 0.7 mm. Again, the diameter of the individual spacers may be the same or may be different.

The spacer may be any suitable material, for example solder glass, a polymer (e.g., Teflon), plastic, ceramic, glass, metal, or the like. In one or more examples, the spacer comprises a steel or a solder glass.

The spacer may include a surface coating that is disposed on the outer surface of the spacer to reduce cracks in the glass panes and reduce scratches when the glass panes flex and move. Any suitable surface coating may be used, for example a surface coating that comprises a low coefficient of friction (e.g., has a lower coefficient of friction than the spacer material). The surface coating may include tungsten disulfide ($WS_2$), molybdenum disulfide ($MoS_2$), tungsten diselenide ($WSe_2$), molybdenum diselenide ($MoSe_2$), or a combination thereof. In some examples, the surface coating is disposed on the top and/or bottom of the spacer. As used herein, "top" and "bottom" of the spacer means the portions of the spacer configured to contact the glass pane, for example that contact the spacer contact regions of the glass pane. In one or more examples, the surface coating is in contact with the inner surface of at least one of the glass panes.

A getter may be positioned inside the cavity. In one or more examples, the glass assembly further comprises at least one getter positioned inside the cavity. The at least one getter may be positioned next to or in direct contact with at least one of the edge surfaces of the third glass pane. In some examples, the getter is positioned between at least one of the edge surfaces of the third glass pane and one of the inner edge surfaces of the frame glass pane. By positioning the getter between the edge surfaces and/or next to the edge surfaces of the third glass pane, the need for a getter recess in the glass panes are avoided. Also, the getter may be positioned so close to the edge of the VIG unit that it is hidden by the sash in the window when the VIG unit is mounted in such.

The getter is constituted from materials that readily form stable compounds with active gases. Before use of a getter, drying and/or annealing of the getter at approximately 700-800 degrees C. for around 20 min-6 hours may be used for driving out hydrogen from the getter.

In one or more examples, the getter is a metal-based getter. The metal-based getter may comprise one or more metals selected from group IV elements. In one or more examples, the one or more metals is titanium, aluminium, zirconium, chromium, vanadium, or alloys thereof.

In one or more examples, the getter is a non-evaporable getter (NEG). The non-evaporate getter may comprise a metallic surface, which is responsible for sorption of gas molecules.

In one or more examples, the getter is in the shape of a circle, an elongated strip, a square or similar. In principle any shape of the getter could be used if it fits inside the cavity.

In one or more examples, a multiple of getters are positioned inside the cavity.

Disclosed is also a vacuum insulated glazing (VIG) unit comprising:
  a first glass pane and a second glass pane each comprising a first major surface, a second major surface, and a thickness defined by the distance between the first major surface, and the second major surface, wherein the second major surfaces, are inner major surfaces opposing each other;
  a third glass pane with, a first major surface, a second major surface, and a thickness defined by the distance between the first major surface and the second major surface, wherein the third glass pane also comprises:
    a first set of parallel edge surfaces including a first edge surface and a second edge surface; and
    a second set of parallel edge surfaces including a third edge surface and a fourth edge surface;
  wherein the third glass pane is positioned between the opposing inner surfaces, of the first glass pane and the second glass pane;
  a side seal material forming a bond with at least the first glass pane and the second glass pane thereby enclosing a cavity formed between the first glass pane and the second glass pane, wherein there is a gap between all of the edge surfaces and the side seal material;
  a number of spacers inside the cavity including a first set of spacers positioned between the first glass pane and the third glass pane and a second set of spacers positioned between the second glass pane and the third glass pane.

The VIG unit according to a fourth and a fifth aspect normally also comprises a frame glass pane positioned between the first glass pane and the second glass pane, the frame glass pane comprising:
  a first major surface extending in a same plane as the first major surface of the third glass pane;
  a second major surface extending in a same plane as the second major surface of the third glass pane;
  a thickness defined by the distance between the first major surface and the second major surface;
  a first set of parallel inner edge surfaces including a first inner edge surface and a second inner edge surface;
  a second set of parallel inner edge surfaces including a third inner edge surface and a fourth inner edge surface;
  a first set of parallel outer edge surfaces including a first outer edge surface and a second outer edge surface;
  a second set of parallel outer edge surfaces including a third outer edge surface and a fourth outer edge surface.

The VIG unit according to the fourth aspect also comprises one or more inserts positioned between at least one of the edge surfaces of the third glass pane and one of the inner edge surfaces of the frame glass pane opposing the edge surfaces of the third glass pane.

In the VIG unit according to the fifth aspect, the third glass pane and the frame glass pane are an integral glass pane with one or more of the edge surfaces of the third glass pane connected to one or more of the inner edge surfaces of the frame glass pane.

The VIG unit according to a sixth aspect does not comprise the frame glass pane, but comprises one or more inserts positioned between at least one of the edge surfaces of the third glass pane and the side seal material.

The properties relating to the glass assembly/VIG unit described in connection to the first, second, and third aspects also applies to the VIG unit according to the fourth aspect.

BRIEF DESCRIPTION OF THE DRAWINGS

Various examples are described hereinafter with reference to the figures. Like reference numerals refer to like elements throughout. Like elements will, thus, not be described in detail with respect to the description of each figure. It should also be noted that the figures are only intended to facilitate the description of the examples. They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

DESCRIPTION OF EXAMPLES

Figure 1:
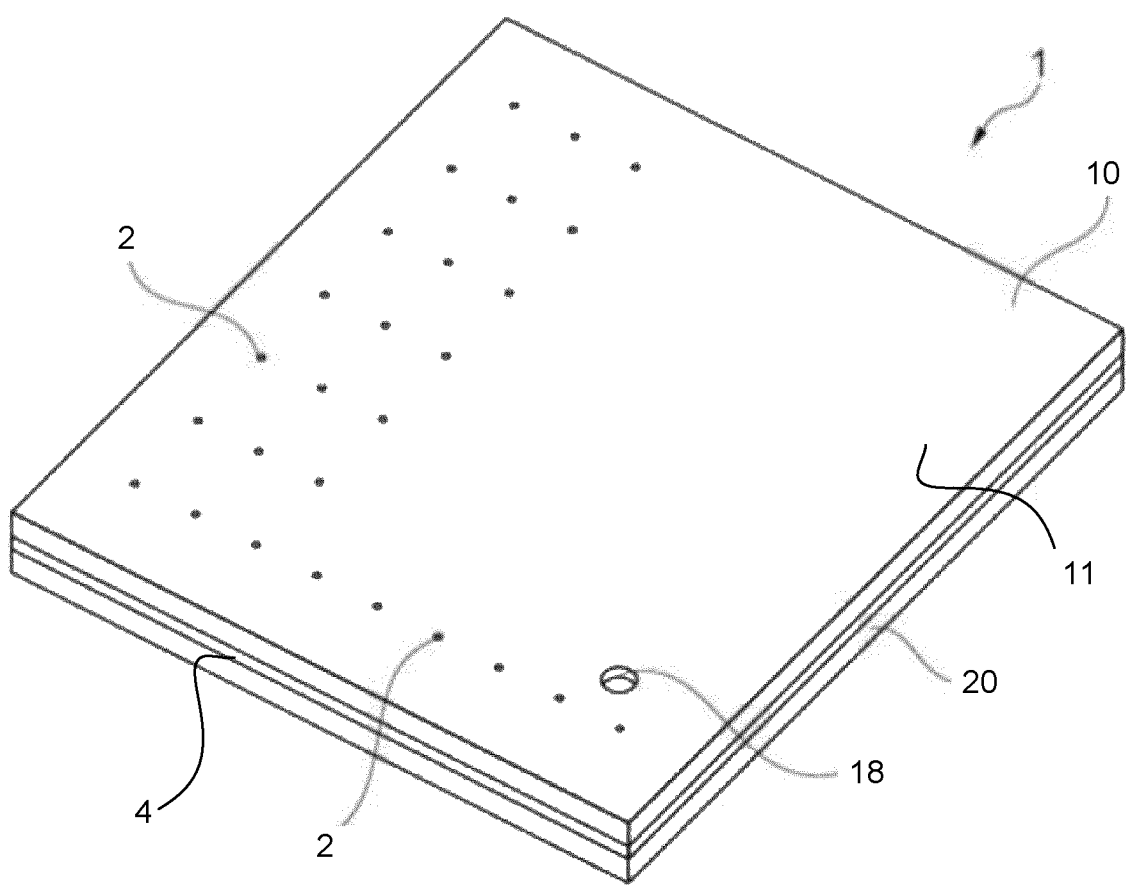
FIG. 1 shows an example of a VIG unit 1 seen in a perspective view.

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present therebetween. Conversely, when a layer, area, element, or plate is referred to as being "directly on" another layer, area, element, or plate, there are no intervening layers, areas, elements, or plates therebetween. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, element, or plate is referred to as being "directly below" another layer, area, element, or plate, there are no intervening layers, areas, elements, or plates therebetween.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed therebetween.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

Figure 2A:
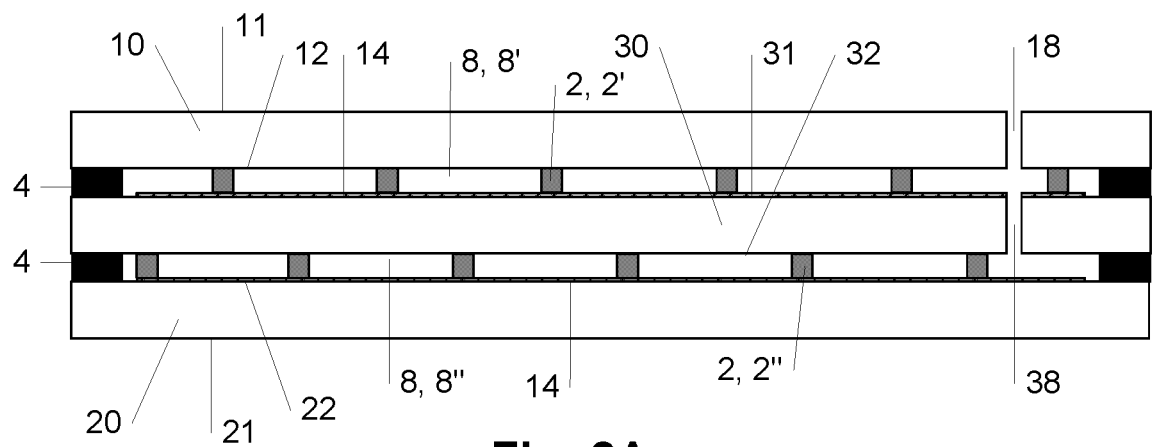
FIGS. 2A-C show different examples of VIG units in a cut-through view.
Figure 2B:
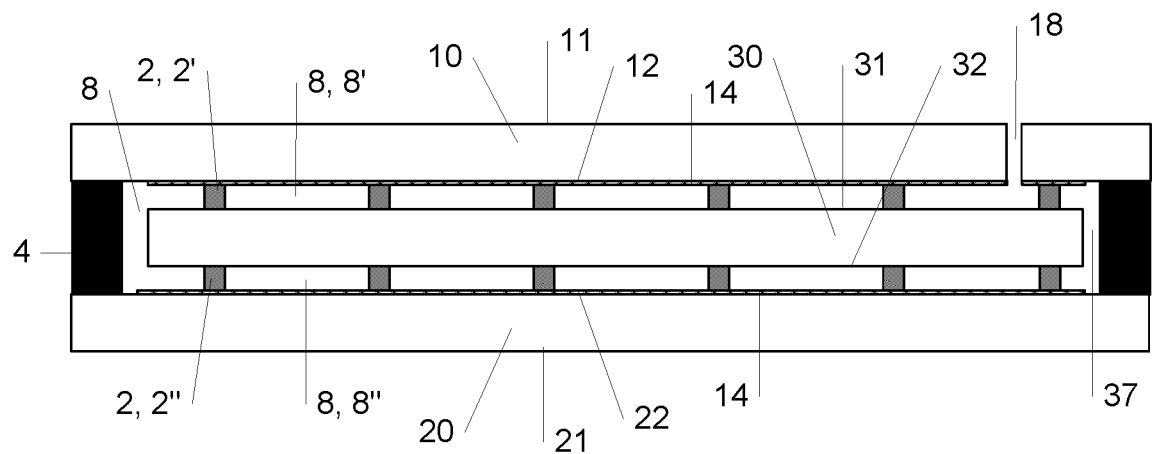
Figure 2C:
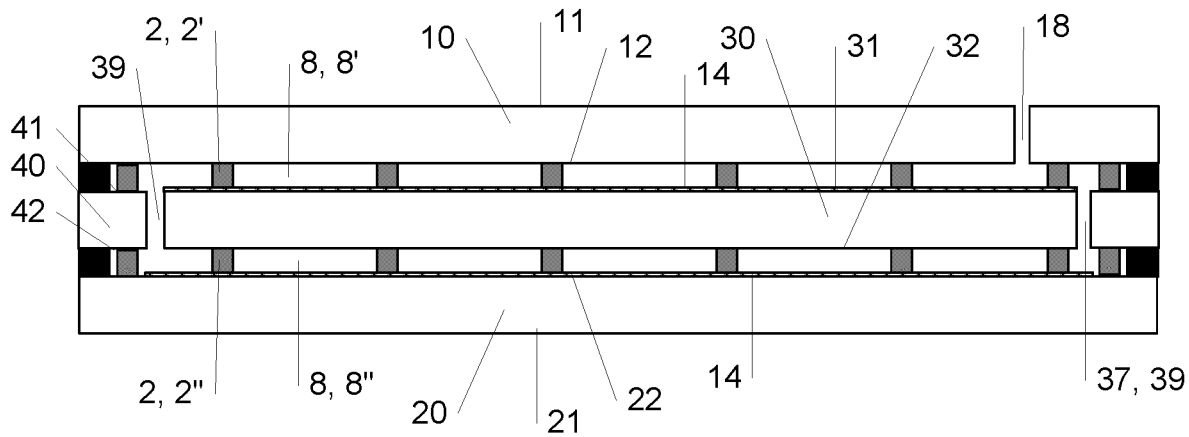

FIG. 1 shows an example of a VIG unit 1 seen from in a perspective view from above/the side. FIGS. 2A-C show three different examples of how the VIG unit 1 may be constructed in cut-through views. FIGS. 3A-C and 4A-C show views of the three different examples of the middle glass pane shown in FIGS. 2A-C. The A figures are correspondingly the same, the B figures are correspondingly the same, and the C figures are correspondingly the same.

The VIG unit 1 comprises a first glass pane 10 and a second glass pane 20, where the first glass pane in shown in a semi transparent manner in FIG. 1 allowing the viewer to see the spacers 2 between the first glass pane 10 and third glass pane 30. The first glass pane 10 comprises two major surfaces—a first major surface 11 and a second major surface 12—opposing each other. The second glass pane 20 likewise comprises two major surfaces—a first major surface 21 and a second major surface 22—opposing each other. The thickness of the two glass panes 10, 20 is defined by the distance between the first major surface 11, 21 and the second major surface 12, 22. The reference numbers are shown such that the second major surfaces 12, 22 of the first and second glass pane 10, 20 are inner surfaces opposing each other in the VIG unit 1. The inner surfaces define the cavity 8 between the first and second glass panes 10, 20 in combination with the side seal material 4.

The side seal material 4 forming a bond with at least the first glass pane 10 and the second glass pane 20 is also seen in FIGS. 1 and 2A-C. Inside the cavity 8 is a third glass pane 30 positioned between the opposing inner surfaces 12, 22 of the first glass pane 10 and the second glass pane 20. The third glass pane 30 also has two major surfaces—a first major surface 31, a second major surface 32—and a thickness defined by the distance between the first major surface 31 and the second major surface 32.

The cavity 8 is divided in two parts by the third glass pane 30; a first cavity part 8' defined by the first glass pane 10 and the third glass pane 30, and a second cavity part 8" defined by the second glass pane 20 and the third glass pane 30.

The first glass pane 10 shown in FIGS. 1 and 2A-C is shown comprising an evacuation opening 18 for evacuating the cavity and for purging a gas through/into the cavity 8, 8', 8".

When evacuating the cavity 8, 8', 8" through the evacuation opening 18, an evacuation cup is normally positioned over the evacuation opening 18. An evacuation member (not shown), e.g. in the form of a hollow tube, such as a hollow glass tube, may be comprised in the evacuation opening 18. The tube will normally be integrated with the glass pane by means of a seal material, e.g. a solder glass frit material, often positioned around the tube in a doughnut shape manner. The hollow tube can be closed by means of a second heating source during production of the VIG unit after the desired pressure is obtained inside the cavity 8, 8', 8".

Aa an alternative to the first glass pane having an evacuation opening and evacuation there through, the side seal material 4 may have small openings before sealing of the material to the glass panes 10, 20 is finalized through which evacuation can occur when placing the glass assembly in a vacuum chamber.

Between the glass panes 10, 20, 30 inside the cavity 8, 8', 8" are a number of spacers 2, 2', 2" including a first set of spacers 2, 2' positioned between the first glass pane 10 and the third glass pane 30 and a second set of spacers 2, 2" positioned between the second glass pane 20 and the third glass pane 30.

The spacers in the first set of spacers 2' are shown in FIGS. 2B-C positioned opposite the second set of spacers 2". In FIG. 2A, the spacers in the first set of spacers 2' is positioned between spacers in the second set of spacers 2".

The third glass pane 30 can be positioned as a floating glass pane not in contact with the side seal material 4 as shown in FIGS. 2B-C or as fixed in the side seal material 4 as shown in FIG. 2A.

As shown in FIGS. 3A-C and 4A-C, the third glass pane 30 comprises four edge surfaces including including a first edge surface 33 and a second edge surface 34 opposite each other and a third edge surface 35 and a fourth edge surface 36 opposite each other.

In the A figures, the side seal material 4 is positioned on the second major surfaces 12, 22 of the first and second glass panes 10, 20 having the edge surfaces 33, 34, 35, 36 of the third pane 30 extending into the side seal material 4. Connection between the two cavity parts 8', 8" is obtained through the opening 38 in the third glass pane 30.

In the example shown in the B and C figures, there is a gap 37 between all of the edge surfaces 33, 34, 35, 36 and the side seal material 4. It is through this gap 37 the two cavity parts 8', 8" are connected, why an additional opening (as the one shown in the A figures) is not needed.

In the C figure, a frame glass pane 40 positioned between the first glass pane 10 and the second glass pane 20 is further included in the VIG unit 1. The frame glass pane 40 comprises a first major surface 41 extending in a same plane as the first major surface 31 of the third glass pane 30, and a second major surface 42 extending in a same plane as the second major surface 32 of the third glass pane 30. This is most clearly seen in FIG. 2C. The thickness of the frame glass pane 40 is defined by the distance between the first major surface 41 and the second major surface 42. As most clearly seen in FIG. 4C, the frame glass pane 40 comprises a first set of parallel inner edge surfaces including a first inner edge surface 43 and a second inner edge surface 44, and a second set of parallel inner edge surfaces including a third inner edge surface 45 and a fourth inner edge surface 46. As further seen in FIG. 4C, the frame glass pane 40 comprises a first set of parallel outer edge surfaces including a first outer edge surface 47 and a second outer edge surface 48, and a second set of parallel outer edge surfaces including a third outer edge surface 49 and a fourth outer edge surface 50. The inner edge surfaces 43, 44, 45, 46 of the frame glass pane 40 are extending into the cavity 8, 8', 8", whereas the outer edge surfaces 47, 48, 49, 50 of the frame glass pane 40 are extending into the side seal material 4 as shown in FIG. 2C. There is also a gap 39 between the edge surfaces 33, 34, 35, 36 of the third glass pane 30 and the inner edge surfaces 43, 44, 45, 46 of the frame glass pane 40. It is through this gap 39 the two cavity parts 8', 8" are connected. The gap 39 is slightly smaller than the gap 37 between the side seal material 4 and the edge surfaces 33, 34, 35, 36 of the third glass pane 30.

Figures 3A, 4A:
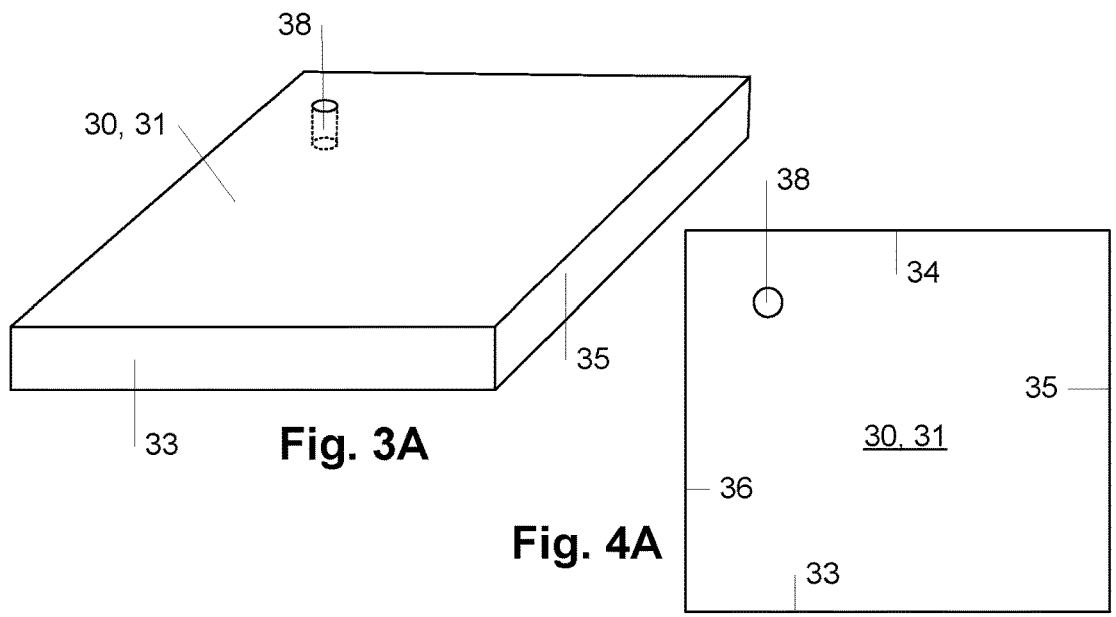
FIGS. 3A-C show the middle glass pane section of the examples of VIG units shown in FIGS. 2A-C, respectively, in a perspective side view.
FIGS. 4A-C show the middle glass pane section of the examples shown in FIGS. 3A-C, respectively, in a top-down view.
Figures 3B, 4B:
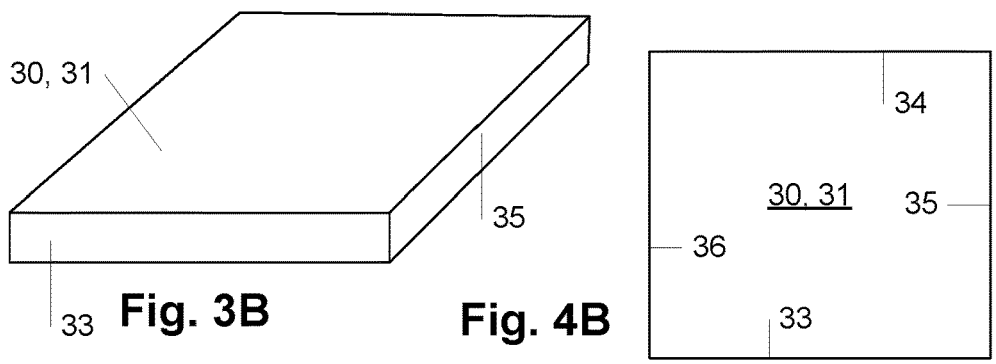
Figures 3C, 4C:
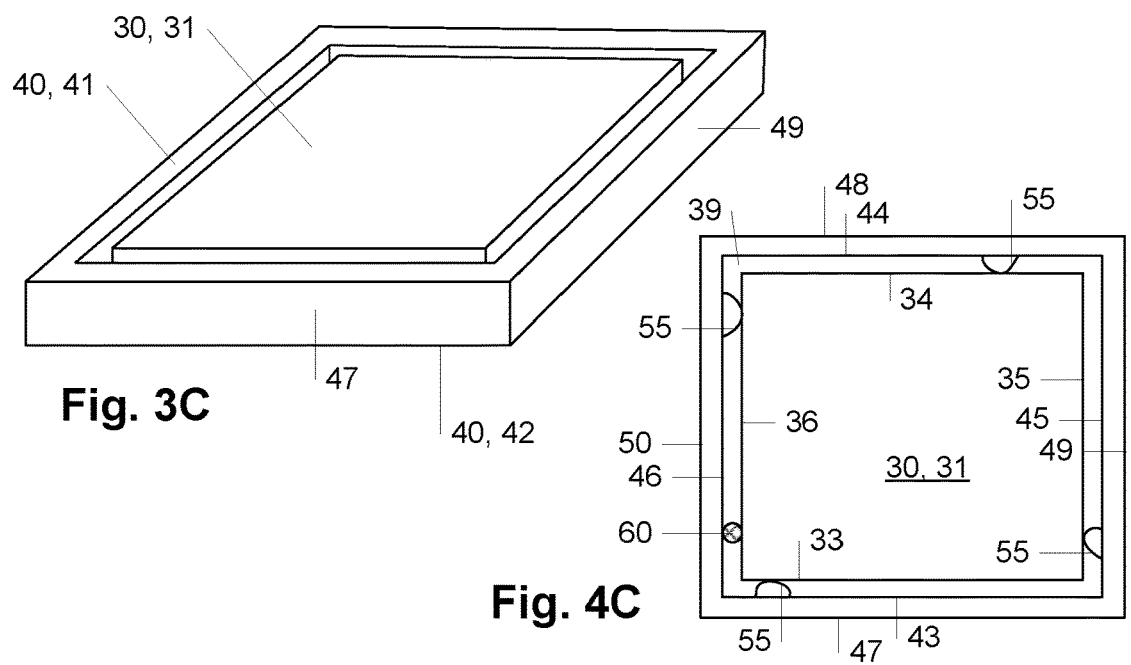

One way of holding the third glass pane 30 between the first glass pane 10 and the second glass pane 20 during the production of the VIG unit is by means of one or more inserts 55 positioned between one or more of the edge surfaces 33, 34, 35, 36 of the third glass pane 30 and one of the opposite positioned inner edge surfaces 43, 44, 45, 46 of the frame glass pane 40. Four inserts 55 are shown in FIG. 4C as examples. Fewer inserts 55 may also be envisioned. The inserts 55 may be resilient inserts such resilient springs, e.g. metal springs.

Alternative, the third glass pane can be held in position by other means. Prior to heating the glass assembly, the third glass pane 30 may e.g. be held between the first glass pane 10 and the second glass pane 20 by a binder on the spacers. The binder normally burns off when increasing the temperature during production. After the binder has burned off and the cavity 8, 8', 8" is evacuated, the third glass pane 30 is held in place by the spacers, e.g. pillars. Thus, the insert 55 shown in the example in FIG. 4C could be omitted.

In FIGS. 2-4, the thickness of all the glass panes 10, 20, 30, 40 is shown as being the same. However, the thickness of the panes may 10, 20, 30, 40 vary. Normally, the third glass pane 30 and the frame glass pane 40 will have the same thickness. This thickness of the third glass pane 30 and the frame glass pane 40 will often be smaller than the thickness of the first glass pane 10 and/or the thickness of the second glass pane 20.

In one or more examples, the thickness of the first glass pane 10 and/or the second glass pane is between 1-8 mm, or between 1.5-6 mm, or between 2-5 mm, or between 2.5-4.5 mm.

In one or more examples, the thickness of the third glass pane 30 and/or the frame glass pane 40 is between 0.2-2.0 mm, or between 0.4-1.5 mm, or between 0.7-1.2 mm, or between 0.8-1.0 mm.

The glass panes 10, 20, 30, 40 are normally annealed glass panes or tempered glass panes. If tempered glass panes are used, chemically tempering or thermally tempering may be used.

As shown in FIGS. 2A-C, one or more of the major surfaces 12, 22, 31, 32 inside the cavity 8, 8', 8" may comprise an additional layer 14, such as a lamination material layer or a low emittance coating layer. The additional layer 14 is shown on the second major surface 22 of the second pane 20 and the second major surface 32 of the third glass pane 30 in FIGS. 2A and 2C, and on the second major surface 12 of the first pane 10 and the second major surface 22 of the second glass pane 20 in FIG. 2B. Though the same reference number is used for the additional layer 14 on all glass panes 10, 20, 30, it need not be the same additional layer on each of the panes in the VIG unit 1. The additional layers 14 could also be omitted or added to other major surfaces than the ones shown in FIG. 2A-C. Two of the major surfaces 12, 22, 31, 32 inside the cavity 8, 8', 8" may comprise the low emittance coating layer. As shown in FIG. 2B, the major surfaces 31, 32 of the third glass pane 30 may be absent of a low emittance coating layer.

A getter may also be 60 positioned inside the cavity 8, 8', 8" as shown in FIG. 4C, displaying the getter 60 between the edge surface 36 of the third glass pane 30 and the inner edge surface 46 of the frame glass pane 40. The getter 60 is shown in the shape of a circle, but could also be in the shape of an elongated strip, a square or similar.

The getter 60 is normally a metal-based getter, which comprises one or more metals selected from group IV elements, such as titanium, aluminium, zirconium, chromium, vanadium, or alloys thereof. A non-evaporable getter NEG is often used. Though FIG. 4C only shows one getter 60, a multiple of getters 40 positioned inside the cavity 8, 8', 8" could also be envisioned.

Figure 5:
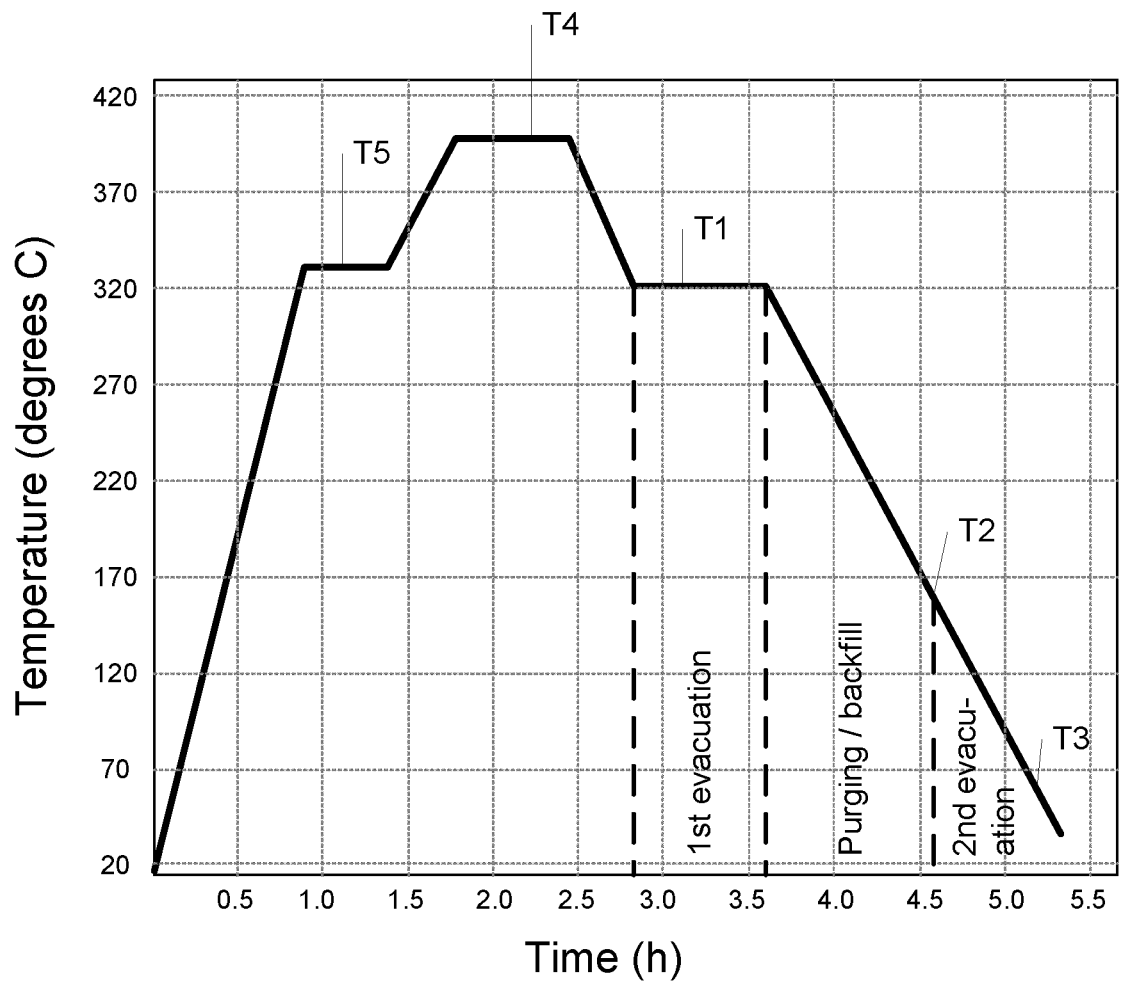
FIG. 5 shows the temperature of the VIG unit as a function of time during an example of a production method for producing a VIG unit.

FIG. 5 shows the temperature of the glass assembly as a function of time during an example of a production of the VIG unit. The method can be divided into two parts, where the first is the assembly of the glass unit bringing it to a heated temperature, and the second part is the cooling an evacuation of the cavity process. The second part proceeds by first obtaining the glass assembly at the first temperature T1 and executing a first evacuation of the cavity 8, 8', 8". Normally the first evacuation is done while maintaining the first temperature T1. After the first evacuation, the evacuated cavity 8, 8', 8" is purged with a gas. The temperature of the glass assembly is reduced to a second temperature T2 while the gas is still present in the cavity 8, 8', 8". When reaching the second temperature T2, a second evacuation of the cavity 8, 8', 8" to obtain a reduced pressure inside the cavity 8, 8', 8" is executed. Afterwards, the cavity is sealed—possibly after lowering the temperature further to a third temperature T3.

The first temperature T1 may be a solidification temperature at which the side seal material 4 solidifies. By solidification temperature is meant the temperature at which the side seal material has solidified after being heated to a temperature where the side seal material has softened allowing it to integrated with the first and the second panes.

The first temperature T1 depends on the material properties of the side seal material, which may also including additional contents such as binder and solvent. The first temperature may be between 275 and 450 degrees Celsius, such as between 290 and 360 degrees Celsius, such as between 300 and 350 degrees Celsius. In the example shown in FIG. 5, the first temperature is 320 degrees Celsius.

In the example shown in FIG. 5, the temperature of the heated glass assembly is maintained at the first temperature T1 while executing the first evacuation of the cavity 8, 8', 8". Normally, the first temperature T1 is maintained for a period of time between 10 and 60 minutes, such as between 20 and 50 minutes, such as between 25 and 45 minutes, such as between 25 and 30 minutes prior to lowering the temperature to the second temperature T2. FIG. 5 shows an example where the first temperature T1 is kept for approximately 45 minutes. Thus, the first evacuation of the cavity 8, 8', 8" may proceed for a period of time between 20 and 50 minutes, such as between 25 and 45 minutes, such as between 25 and 30.

The second temperature T2 is lower than the first temperature T1. In one or more examples, the second temperature is at least 10%, such as at least 20%, such as at least 30%, such as at least 40%, such as at least 50%, such as at least 60% lower than the first temperature. The larger the temperature difference is between the first and second temperature, the smaller is the difference between the second temperature and room temperature, the latter being the temperature at which the VIG unit is normally handled when the production of the VIG unit is finalized.

The second temperature T2 will, as the first temperature T1 did, depend on the contents of which the side seal material is comprised. In one or more examples, the second temperature is between 20 and 300 degrees Celsius, such as between 50 and 290 degrees Celsius, such as between 80 and 270 degrees Celsius, such as between 110 and 250 degrees Celsius, such as between 120 and 230 degrees Celsius, such as between 130 and 200 degrees Celsius, such as between 140 and 160 degrees Celsius, or approximately 150 degrees Celsius as shown in FIG. 5.

In one or more examples, cooling of the glass assembly from the first temperature T1 to the second temperature T2 proceeds at a cooling rate of at least 1 degrees Celsius per minute, such as at least 2 degrees Celsius per minute, such as at least 5 degrees Celsius per minute, such as at least 10 degrees Celsius per minute.

After reaching the second temperature T2, a second evacuation of the cavity 8, 8', 8" is initiated. At the same time, the temperature of the glass assembly is reduced to a third temperature T3 while executing the second evacuation of the cavity 8, 8', 8". When reaching the third temperature T3, the cavity 8, 8', 8" is sealed. Thus, the sealing the cavity 8, 8', 8" is performed at the third temperature T3. The third temperature T3 can e.g. be between 20 and 100 degrees Celsius, such as between 40 and 80 degrees Celsius, or such as between 50 and 70 degrees Celsius. In FIG. 5, the third temperature is shown as approximately 60 degrees Celsius.

The same or a different cooling rate may be used for cooling from the second temperature T2 to the third temperature T3 as compared to the cooling from the first temperature T1 to the second temperature T2. This second cooling may proceed at a rate of at least 1 degrees Celsius per minute, such as at least 2 degrees Celsius per minute, such as at least 5 degrees Celsius per minute, such as at least 10 degrees Celsius per minute.

Prior to providing the heated glass assembly having the first temperature T1, the glass assembly may have been heated to a higher fourth temperature T4 from where the temperature is reduced to the first temperature T1. The fourth temperature T4 is in the example shown in FIG. 5 a softening temperature at which the side seal material 4 is softened allowing it to bond with at least the first glass pane 10 and the second glass pane 20 when the temperature is later lowered to the first temperature T1. The softening temperature will depend on the material properties of the side seal material 4. Often, the fourth temperature is between 350 and 450 degrees Celsius, such as between 370 and 425 degrees Celsius, or such as between 380 and 410 degrees Celsius. FIG. 5 show an example where the fourth temperature is approximately 395 degrees Celsius. The fourth temperature will be maintained for a time period to ensure that the side seal material is sufficiently soft for it to bond with the glass panes. The time period depends on the material properties of the side seal material, the thickness of the side seal material layer, the temperature to which the side seal material is heated, etc. Examples of time periods include a period of time between 10 and 60 minutes, such as between 20 and 50 minutes, such as between 25 and 45 minutes, such as between 25 and 30 minutes prior to lowering the temperature to the first temperature. The time period at the fourth temperature T4 shown in FIG. 5 is approximately 45 minutes.

Prior to reaching the fourth temperature T4, the glass assembly may be heated to and kept at a fifth temperature T5 for a period of time before increasing the temperature of the glass assembly from the fifth temperature T5 to the fourth temperature T4. The fifth temperature T5 is normally referred to as a burn off temperature at which impurities in the side seal material 4 is burned off. Such impurities may include binder and/or solvents if present in the side seal material. Also, a general outgassing of the side seal material prior to the procedure of bonding the side seal material to the glass panes may also be performed at the fifth temperature T5. As for the softening and solidification temperature, the fifth temperature will depend on the material properties of the side seal material also including potential additional contents such as binder and solvent.

In one or more examples, the fifth temperature T5 is between 270 and 360 degrees Celsius, such as between 280 and 340 degrees Celsius, or such as between 300 and 330 degrees Celsius. FIG. 5 show an example where the fifth temperature T5 is approximately 325 degrees Celsius. The fifth temperature T5 will normally be maintained for a period of time between 10 and 60 minutes, such as between 20 and 50 minutes, such as between 25 and 45 minutes, such as between 25 and 30 minutes prior to increasing the temperature to the fourth temperature T4. FIG. 5 shows a period of 30 minutes.

In the example shown in FIG. 5, the fifth temperature T5 is higher than the first temperature T1. Thus, the burn off temperature is higher than the solidification temperature in the shown example.

Prior to providing the heated glass assembly having the fifth temperature T5, the glass assembly may be heated from room temperature to the fifth temperature T5. Alternatively, the glass assembly may be assembled at a higher temperature than room temperature.

REFERENCES

1 vacuum insulated glazing unit
2 spacers
2' first set of spacers
2" second set of spacers
4 side seal material
8 cavity
8' first cavity part
8" second cavity part
10 first glass pane
11 first major surface of the first glass pane
12 second major surface of the first glass pane
14 additional layer such as low emittance coating layer or a lamination layer
18 evacuation opening in the first glass pane
19 evacuation member
20 second glass pane
21 first major surface of the second glass pane
22 second major surface of the second glass pane
30 third glass pane
31 first major surface of the third glass pane
32 second major surface of the third glass pane
33 first edge surface of the third glass pane
34 second edge surface of the third glass pane
35 third edge surface of the third glass pane
36 fourth edge surface of the third glass pane
37 gap between the edge surfaces of the third glass pane and the side seal material
38 through-going opening in the third glass pane
39 gap between the edge surfaces of the third glass pane and the inner edge surfaces of the frame glass pane
40 frame glass pane
41 first major surface of the frame glass pane
42 second major surface of the frame glass pane
43 first inner edge surface of the frame glass pane
44 second inner edge surface of the frame glass pane
45 third inner edge surface of the frame glass pane
46 fourth inner edge surface of the frame glass pane
47 first outer edge surface of the frame glass pane
48 second outer edge surface of the frame glass pane
49 third outer edge surface of the frame glass pane
50 fourth outer edge surface of the frame glass pane
55 inserts, such as metal springs
60 getter
T1 first temperature
T2 second temperature
T3 third temperature
T4 fourth temperature
T5 fifth temperature

The invention claimed is:

1. A method of providing a VIG unit, wherein the method comprises
   pumping a gas into a cavity of a VIG assembly comprising two cavity parts separated by a glass pane subsequent to an evacuation step,
   evacuating the cavity thereby providing a convection cooling inside the cavity of the VIG assembly during a further cooling,
   whereafter, the cavity is evacuated and sealed.

2. A method for producing a vacuum insulated glazing unit, the method comprising:
   providing a heated glass assembly at a first temperature, the heated glass assembly comprising:
   a first glass pane and a second glass pane each comprising a first major surface, a second major surface, and a thickness defined by the distance between the first major surface and the second major surface, wherein the second major surfaces are inner surfaces opposing each other;
   a third glass pane with a first major surface, a second major surface, and a thickness defined by the distance between the first major surface and the second major surface, wherein the third glass pane is positioned between the opposing inner surfaces of the first glass pane and the second glass pane;

a side seal material forming a bond with at least the first glass pane and the second glass pane thereby enclosing a cavity formed between the first glass pane and the second glass pane;

a number of spacers inside the cavity including a first set of spacers positioned between the first glass pane and the third glass pane and a second set of spacers positioned between the second glass pane and the third glass pane, wherein the method further comprises:
executing a first evacuation of the cavity;
purging the evacuated cavity with a gas;
reducing the temperature of the glass assembly to a second temperature while the gas is still present in the cavity;
executing a second evacuation of the cavity to obtain a reduced pressure inside the cavity;
sealing the cavity thereby obtaining the vacuum insulated glazing unit.

3. The method according to claim 2, wherein the first temperature is a solidification temperature at which the side seal material solidifies.

4. The method according to claim 2, wherein the first temperature is between 275 and 450 degrees Celsius.

5. The method according to claim 2, wherein the temperature of the heated glass assembly is maintained at the first temperature while executing the first evacuation of the cavity.

6. The method according to claim 2, further comprising maintaining the temperature at the first temperature for a period of time between 10 and 60 minutes, prior to lowering the temperature to the second temperature, and wherein the first evacuation of the cavity proceeds for a period of time between 20 and 50 minutes.

7. The method according to claim 2, wherein the second temperature is at least 10% lower than the first temperature.

8. The method according to claim 2, wherein cooling of the glass assembly from the first temperature to the second temperature proceeds at a cooling rate of at least 1 degrees Celsius per minute.

9. The method according to claim 2, wherein the second temperature is between 20 and 300 degrees Celsius.

10. The method according to claim 2, further comprising reducing the temperature of the glass assembly from the second temperature to a third temperature while executing the second evacuation of the cavity and prior to sealing the cavity.

11. The method according to claim 10, wherein the sealing the cavity is performed at the third temperature.

12. The method according to claim 10, wherein cooling of the glass assembly from the second temperature to the third temperature proceeds at a second cooling rate of at least 1 degrees Celsius per minute.

13. The method according to claim 2, wherein prior to providing the heated glass assembly having the first temperature, the method further comprises:
proving the glass assembly at a fourth temperature; and
reducing the temperature of the glass assembly from the fourth temperature to the first temperature.

14. The method according to claim 13, wherein the fourth temperature is a softening temperature at which the side seal material is softened allowing it to bond with at least the first glass pane and the second glass pane when lowering the temperature to the first temperature.

15. The method according to claim 2, wherein the gas comprises dry air, an inert gas, carbon dioxide ($CO_2$), nitrogen ($N_2$), and ozone ($O_3$), or a mixture thereof.

16. The method according to claim 2, wherein the gas is purged into the evacuated cavity at a pressure of 0.01-0.50 atmosphere.

17. The method according to claim 2, wherein the first glass pane comprises an evacuation opening, wherein the method further comprises placing an evacuation cup over the evacuation opening proving access to the cavity prior to initiating any temperature increasing/decreasing step(s), wherein reducing the pressure inside the sealed cavity during the first evacuation and the second evacuation is obtained by means of the evacuation cup, wherein the evacuation cup is used for supplying the gas to the cavity.

18. The method according to claim 2, wherein reducing pressure inside the sealed cavity to the first pressure and the second pressure is obtained through openings between the side seal material and the glass panes prior to finalizing the sealing of the cavity, wherein the method further comprises placing the glass assembly inside a vacuum chamber prior to reducing pressure inside the sealed cavity.

19. The method according to claim 2, wherein said first evacuation, said purging the evacuated cavity with a gas, and said second evacuation occur through a single evacuation opening.

20. The method according to claim 2, wherein the second temperature is at least 30% lower than the first temperature.

21. A method for reducing the occurrence of fractures in middle glass panes in a vacuum insulated glazing unit comprising one or more middle glass panes positioned inside a cavity in the vacuum insulated glazing unit, the method comprising:
providing a heated glass assembly at a first temperature, the heated glass assembly comprising:
a first glass pane and a second glass pane each comprising a first major surface, a second major surface, and a thickness defined by the distance between the first major surface and the second major surface, wherein the second major surfaces are inner surfaces opposing each other;
a third glass pane with a first major surface, a second major surface, and a thickness defined by the distance between the first major surface and the second major surface, wherein the third glass pane is positioned as a middle glass pane between the opposing inner surfaces of the first glass pane and the second glass pane;
a side seal material forming a bond with at least the first glass pane and the second glass pane thereby enclosing a cavity formed between the first glass pane and the second glass pane;
a number of spacers inside the cavity including a first set of spacers positioned between the first glass pane and the third glass pane and a second set of spacers positioned between the second glass pane and the third glass pane,
wherein the method further comprises:
executing a first evacuation of the cavity;
purging the evacuated cavity with a gas;
reducing the temperature of the glass assembly to a second temperature while the gas is still present in the cavity;
executing a second evacuation of the cavity to obtain a reduced pressure inside the cavity;
sealing the cavity thereby obtaining the vacuum insulated glazing unit.

* * * * *